(No Model.)
W. A. BOLE.
METHOD OF SECURING PULLEYS OR CRANK DISKS TO SHAFTS.
No. 314,788. Patented Mar. 31, 1885.
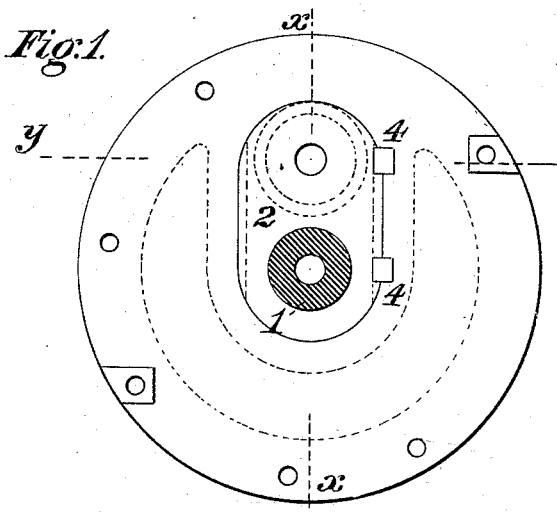
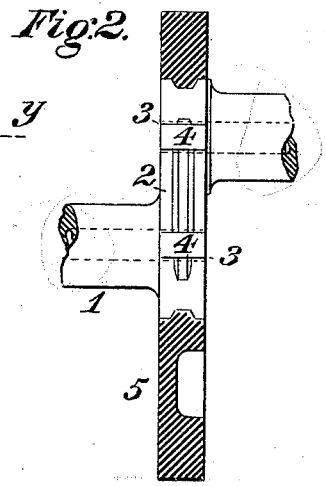
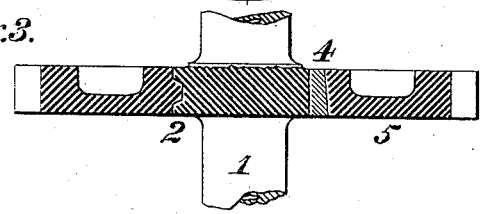
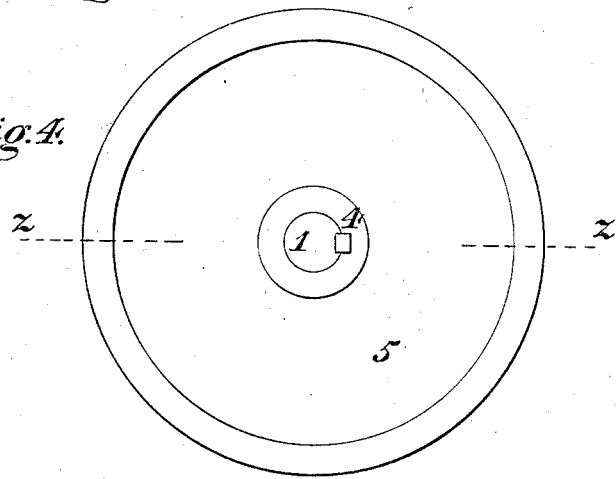
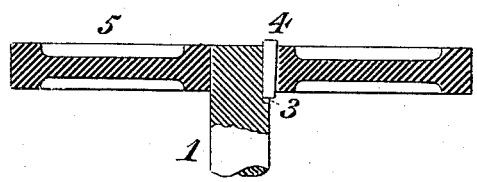
WITNESSES:
J. Snowden Bell
C. M. Clarke
INVENTOR.
William A. Bole,
BY George H. Christy
ATTORNEY
N. PETERS. Photo-Lithographer, Washington, D. C.

UNITED STATES PATENT OFFICE.

WILLIAM A. BOLE, OF PITTSBURG, PENNSYLVANIA.

METHOD OF SECURING PULLEYS OR CRANK-DISKS TO SHAFTS.

SPECIFICATION forming part of Letters Patent No. 314,788, dated March 31, 1885.

Application filed December 16, 1884. (No model.)

*To all whom it may concern:*

Be it known that I, WILLIAM A. BOLE, a citizen of the United States, residing at Pittsburg, in the county of Allegheny and State of Pennsylvania, have invented or discovered a certain new and useful Improvement in Securing Pulleys or Crank-Disks to Shafts, of which improvement the following is a specification.

In the accompanying drawings, which make part of this specification, Figure 1 is an end view of a crank-disk and crank, illustrating the application of my invention; Fig. 2, a sectional elevation at the line $xx$ of Fig. 1; Fig. 3, a section at the line $yy$ of Fig. 1; Fig. 4, an end view of a pulley fixed upon a shaft in accordance with my invention, and Fig. 5 a transverse section at the line $zz$ of Fig. 4.

My invention is an improvement upon that for which Letters Patent of the United States No. 297,313, dated April 22, 1884, were granted and issued to the Westinghouse Machine Company, as assignee of Harris Tabor; and its object is to insure the firm connection of a crank-disk or pulley to a shaft or crank-arm when united therewith by being cast thereon.

To this end my improvement, generally stated, consists in a novel method of securing a crank-disk or pulley to a shaft by casting the same upon and around said shaft and around the outer side of a loose adjustable key fitted longitudinally therein, and thereafter tightening said key, as hereinafter more fully set forth.

It has been found in practice that in uniting a cast-metal member to another which has been previously formed, either of cast or wrought metal, by casting the former around the latter, as in Letters Patent No. 297,313, above referred to, such connection of the two as will be perfectly exempt from looseness is not in all cases attainable, owing to the contraction of the new casting in the solidification of the metal of which it is composed, and the tightening or clamping together of the two by the usual mechanical expedient of keying is inconvenient and objectionable by reason of the fact that the new casting chills and becomes so hard on its surface adjoining that of the older member that the cutting and proper fitting of keyways are difficult, if not impracticable. Under my invention I dispense with the operation of cutting keyways in the new casting, while attaining a firm and tight connection by the wedging action of a perfectly-fitting and readily-adjustable key.

In the practice of my invention a longitudinal recess or keyway, 3, of which there may be one or more, as desired, is cast or otherwise formed in the periphery of the shaft 1, (or of the crank-arm 2 of said shaft, as the case may be,) to which the pulley, crank-disk, balance-wheel, or other member is to be attached, said recess being substantially parallel with the axial line of the shaft, and, if upon the crank-arm, extending preferably from one face thereof to the opposite face. A key, 4, corresponding in width with and of about the same length as the keyway, and tapered or inclined from one end to the other, is fitted with the capacity of longitudinal movement in the keyway, the key projecting above the keyway throughout its length, to engage the casting subsequently to be formed. The shaft, with the inserted key or keys, is next set in proper position in molding-sand, in which, by the use of a suitable pattern, a mold is formed. The disk or pulley 5 is then cast in said mold, completely surrounding the periphery of the crank or shaft and projecting portion of the key or keys. After the solidification and contraction of the cast metal, the key is driven tightly to a bearing, and any looseness which might otherwise result from the contraction of the casting will be effectually prevented. The inconvenience and expense of fitting the key to the disk are thus obviated, and the draft of the key on the disk is exerted against a surface with which the key is accurately in correspondence.

It will be obvious that my invention may be similarly applied in the connection of members other than those selected for illustration—as, in many instances, where it is desired to combine a casting and forging without expensive fitting—such applications being within the ordinary ability of those skilled in the art to which my improvements relate. Further, I am aware that a disk connected to a crank by being cast thereon, and a disk or pulley connected to a shaft by being keyed thereto, as also an expansible split sleeve cast around a removable core which acts as the support for a key and a dividing-piece, were known at the date of my invention, and such, therefore, I distinctly disclaim.

My invention differs from the construction last referred to in the essential particular that I combine, in the connection of the crank or shaft and disk, a shrink fit, due to the contraction of the casting, with a wedging fit effected by the draft of the key upon a continuous body of metal, while in the former case the connection of the sleeve and shaft is effected only by the action of the key against clamping-bands applied subsequently to the casting of the sleeve, and no attachment by contraction of the metal is contemplated or obtainable.

I claim herein as my invention—

The improvement in the method of securing crank-disks, pulleys, &c., to shafts, which consists in first fitting a wedging-key in a longitudinal recess in the periphery of the shaft or of a crank-arm thereon, then casting the disk or pulley upon and continuously around the shaft and key, and finally driving the key to a tight bearing, after the solidification and contraction of the casting, upon the member which it permanently incloses, substantially as set forth.

In testimony whereof I have hereunto set my hand.

WILLIAM A. BOLE.

Witnesses:
J. SNOWDEN BELL,
FRANK W. HUGHEY.